April 18, 1933.   W. D. RIGNEY   1,904,883
FLOATING CHUCK FOR TAPPING MACHINES
Filed July 11, 1930
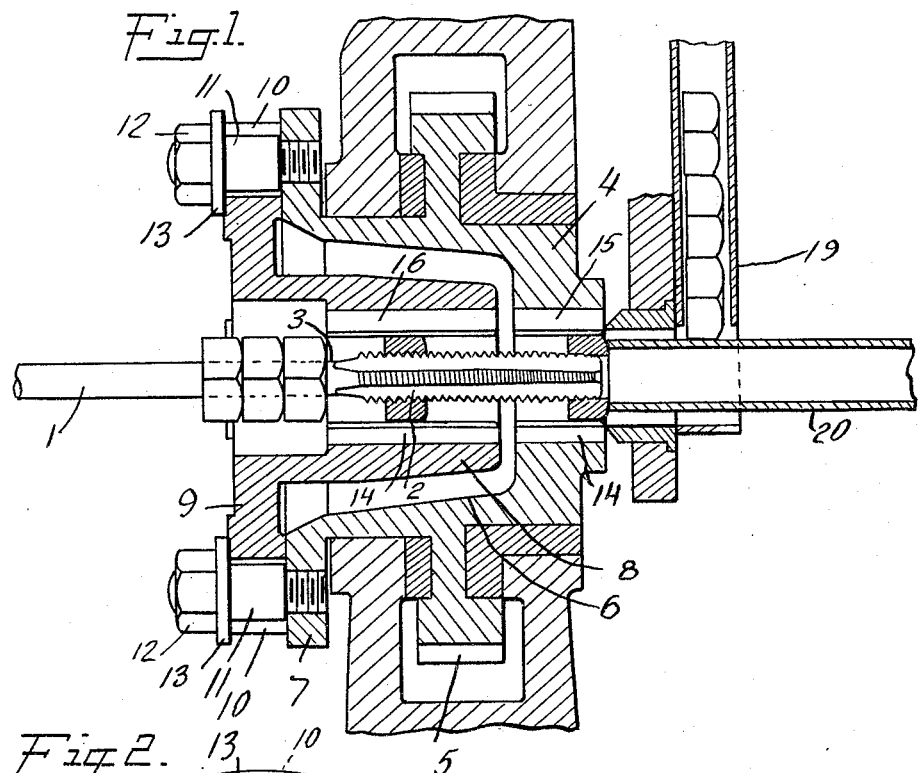
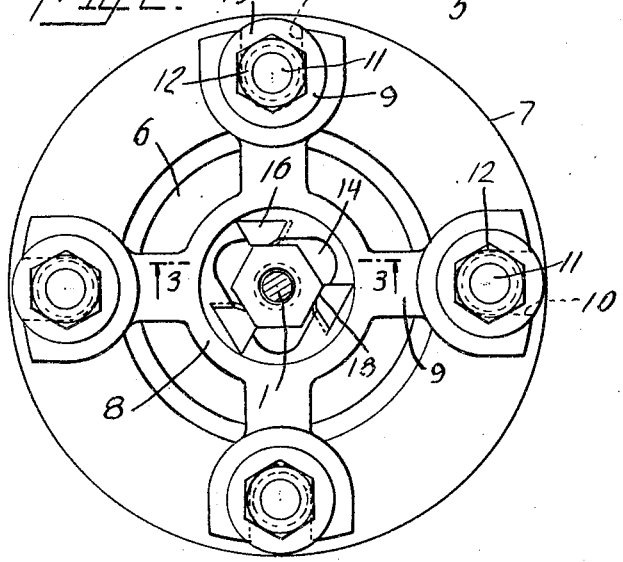
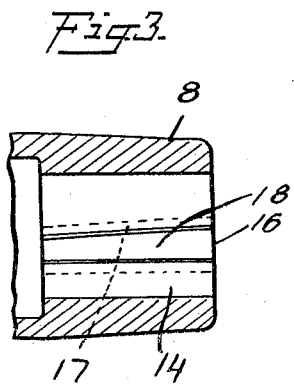
INVENTOR
William D. Rigney
BY
Pennie, Davis, Marvin & Edmonds
ATTORNEYS Patented Apr. 18, 1933

1,904,883

UNITED STATES PATENT OFFICE

WILLIAM D. RIGNEY, OF PORT CHESTER, NEW YORK, ASSIGNOR TO RUSSELL, BURDSALL & WARD BOLT & NUT COMPANY, OF PORT CHESTER, NEW YORK, A CORPORATION OF NEW YORK

FLOATING CHUCK FOR TAPPING MACHINES

Application filed July 11, 1930. Serial No. 467,147.

This invention relates to nut tapping machines and is an improvement over the apparatus described and claimed in my prior Patent No. 1,147,267 granted July 20, 1915. The nut tapping machine of my prior invention comprises a floating tap which is positioned by the nut blanks passing over it and a rotating chuck having an axially arranged passage for the nuts in which the nuts are restrained against relative rotation with respect to the chuck whereby the nuts are rotated over the tooling portion of the tap and internally threaded.

The present invention relates particularly to the construction of the chuck and embodies a main body portion and a floating member, each having suitable wear plates in the passage to engage the sides of the nut. This construction permits the location of two nut blanks on the threaded portion of the tap at the same time, without danger of breaking the tap, even if the holes in the blanks are not centrally located with respect to the outer surfaces. The floating chuck member will move so that the center of the hole in the blank contained in, and driven by it, will be in line with the center of the hole in the blank contained in and driven by the main body portion of the chuck. The nut blanks are so spaced on the threaded portion of the tap that each nut passes from the main body portion into the floating chuck before the next blank is pushed on to the tap, and further, that each blank passes off of the threaded portion of the tap before the following nut engages the wear plates in the floating member.

A further feature of the invention is the provision of wear plates in the axial opening of the chuck. Each plate is provided with a pressure surface which is adapted to engage the adjacent side of the nut blank substantially at one of the corners of the blank. Because the plates engage the sides of the nut blanks instead of the corners, the latter do not wear grooves in the plates.

In the accompanying drawing I have illustrated one form of the invention. In this showing, Fig. 1 is a central, sectional view through the chuck and the end of the tap;

Fig. 2 is an end elevation of the chuck viewed from the left in Fig. 1; and

Fig. 3 is a detailed, sectional view on line 3—3 of Fig. 2.

Referring to the drawing, the reference numeral 1 designates generally a tap which may be supported by the nut blanks in the manner described and claimed in my prior patent referred to above. For simplicity of illustration the supporting means for the tap is not illustrated. The tap is provided with a tooling portion 2 which may have conventional relieved cutting threads. The threads are adapted to enter the hole of the nut blank to cut internal threads therein in the usual manner. Beyond the tooling portion the shank is reduced in cross section as at 3 so that the threaded nut blanks will feed along the shank of the tap more readily.

As described in my prior patent the blanks are fed along the tap by means of a rotating chuck having an axial opening in which the nut blanks are held against relative rotation so that as the chuck and blanks are rotated together the threads 2 of the tap feed the nut blank through the opening in the chuck and cut the threads. The chuck herein disclosed consists of a main body portion 4 which may be driven in any suitable manner as by means of gear teeth 5 on the periphery of the chuck member adapted to mesh with a drive gear (not shown). The main body member of the chuck is recessed as indicated at 6 and is provided with a circular flange 7 at one end thereof. A floating chuck member 8 is adapted to be received in this recess and is provided with a plurality of arms 9 arranged in contact with the outer surface of the flange 7. These arms are provided with openings or slots 10 adapted to receive studs 11 which are threaded and riveted into the flange 7. The outer ends of the studs are threaded for the reception of nuts 12 and washers 13 are arranged between the nuts and the adjacent portion of the arms 9. The slots 10 are wider than the studs 11, and thus permit movement of the entire member 8 in any direction, providing a floating chuck member.

The chuck is provided with an axial passage 14 extending through both the main body portion and the floating chuck member. This passage is provided with wear plates, one set of wear plates 15 being arranged in the portion of the passage in the main chuck member 4 and similar wear plates 16 being arranged in the floating chuck member. As shown, the wear plates are wedged shaped with the base portions of the wedges mounted in suitable openings or recesses in the wall of the passage. The wear plates taper longitudinally as indicated at 17 in Fig. 3 of the drawing. These wear plates are provided with pressure surfaces 18 which engage the sides of the nut blank adjacent a corner thereof as shown in Fig. 2 of the drawing.

Any suitable means may be employed for feeding the blanks to the chuck as disclosed and claimed in my prior patent. The blanks may be fed through a chute 19 to a position in alignment with the axial passage of the chuck and may then be delivered into the passage by a reciprocating member 20. This reciprocating member may be operated by the means disclosed in my prior patent or by any other suitable means.

The operation of the device will be apparent from the foregoing description. The passage 14 may be of any shape that will prevent relative rotation of the nut blank and chuck. It should be preferably larger than the blank to permit the circulation of water or other cooling fluid. A fluid such as water is preferably employed for cooling the tap as it also serves as a means for removing the chips formed in the threading operation. As the blanks are fed on to the end of the tap by the reciprocating member 20 and are rotated with respect to the tap by the rotation of the chuck the cutting threads 2 of the tap propel the blank along the tap longitudinally thereof and cut the threads.

Where a one piece chuck is employed, nut blanks having "out of center" holes are apt to break the tap if two of them are located on the threaded portion at the same time. By providing the floating chuck member 8, two such blanks can be located on the threaded portion of the tap at the same time without danger of breakage, because the blank in the floating member can move until its hole is in line with the hole in the blank in the main body portion of the chuck. An important feature of the invention is the arrangement of the wear plates 16 with their faces parallel to the sides of the nut blank and adapted to engage the sides adjacent the corners, rather than the corners themselves. I have found that this construction reduces the tendency of the nut blanks to wear grooves in the pressure surfaces or engaging faces of the wear plates.

I claim:

1. In a nut tapping machine, a threaded tap and a revolving chuck arranged axially of said tap and having an axial passage shaped to prevent rotation of a nut blank relative to said chuck, said chuck comprising a driven member and a floating member carried by said driven member whereby a nut blank to be threaded may be positioned in each member of said chuck at the same time.

2. In a nut tapping machine, a threaded tap and a revolving chuck arranged axially of said tap and having an axial passage shaped to prevent rotation of a nut blank relative to said chuck, said chuck comprising a driven member and a floating member carried by said driven member whereby a nut blank to be threaded may be positioned in each member of said chuck at the same time, the walls of the passage of said chuck being provided with wear plates.

3. In a nut tapping machine, a threaded tap, a revolving chuck member having an axial passage and a floating chuck member carried by said revolving chuck member and having an axial passage in alignment with said first mentioned passage whereby a nut blank to be threaded may be positioned in said revolving chuck member and said floating chuck member at the same time, the walls of said passages being provided with wear plates adapted to engage the side walls of a nut blank adjacent a corner of the blank.

4. In a nut tapping machine, a threaded tap, a revolving chuck member having an axial passage, said passage being substantially triangular in cross section, a floating chuck member carried by said revolving chuck member and having an axial passage in alignment with the passage of the chuck member, said passage being substantially triangular in cross section whereby a nut blank to be threaded may be positioned in said revolving chuck member and said floating chuck member at the same time, and wear plates arranged in the walls of said passages, each of the wear plates being adapted to engage a side wall of a nut blank.

5. In a nut tapping machine, a threaded tap, a revolving chuck comprising a driven member and a floating member carried by said driven member, said chuck being provided with an axial passage whereby a nut blank to be threaded may be positioned in each member of said chuck at the same time, and wear plates arranged in each of the walls of said passage, each of said wear plates being provided with a pressure surface adapted to engage the side wall of a nut blank adjacent a corner thereof.

6. A nut-tapping machine comprising a threaded tap, a main revolving chuck member having an axial passage, and a revolving floating chuck member having an axial passage in alignment with said first-mentioned passage, each of said passages being adapted to receive and rotate a nut blank relative to the tap and to permit sliding movement of the nut blank along the walls of the passages as the nut blank is progressed by the threads of the tap, whereby the tap may simultaneously operate upon one nut blank in the passage of the main chuck member and another nut blank in the passage of the floating chuck member.

7. A nut-tapping machine in accordance with claim 6, in which the main chuck member has a recess in alignment with the axial passage and in which the floating chuck member is arranged in said recess.

8. A nut-tapping machine in accordance with claim 6, in which the main chuck member has a recess in alignment with the axial passage and in which the floating chuck member is arranged in said recess, and wear plates mounted in the walls of the passages in the two chuck members.

9. A nut-tapping machine in accordance with claim 6, in which the main chuck member has a recess in alignment with the axial passages, and in which the floating chuck member is arranged in said recess, each of the passages in said chuck members being substantially triangular in cross-section.

10. A nut-tapping machine in accordance with claim 6, in which the main chuck member is provided with a recess in alignment with the axial passage and in which the floating chuck member is arranged in said recess, the face of said chuck member beyond said recess being provided with a flange, and arms carried by said floating chuck member and secured to said flange so as to allow motion of said floating chuck member relative to the main chuck member.

In testimony whereof I affix my signature.

WILLIAM D. RIGNEY.